(12) United States Patent
Wilson

(10) Patent No.: US 11,793,159 B1
(45) Date of Patent: Oct. 24, 2023

(54) LIVESTOCK TROUGH AND SYSTEM

(71) Applicant: Brandon Wilson, Andrews, TX (US)

(72) Inventor: Brandon Wilson, Andrews, TX (US)

(*) Notice: Subject to any disclaimer, the term of this patent is extended or adjusted under 35 U.S.C. 154(b) by 0 days.

(21) Appl. No.: 17/712,491

(22) Filed: Apr. 4, 2022

(51) Int. Cl.
*A01K 5/01* (2006.01)
*E04H 17/02* (2006.01)
*A01K 3/00* (2006.01)

(52) U.S. Cl.
CPC ............... *A01K 5/01* (2013.01); *A01K 3/00* (2013.01); *E04H 17/055* (2021.01)

(58) Field of Classification Search
CPC .......... A01K 5/01; A01K 3/00; A01K 1/0356; E04H 17/055; E04H 17/1456; E04H 17/1465
USPC .......................................................... 119/58
See application file for complete search history.

(56) References Cited

U.S. PATENT DOCUMENTS

| | | | | |
|---|---|---|---|---|
| 3,626,468 A | * | 12/1971 | Hanson | A01K 1/10 119/515 |
| 5,522,345 A | * | 6/1996 | Payne | A01K 1/10 119/58 |
| 5,921,202 A | * | 7/1999 | Schulz | A01K 5/01 119/58 |
| 2002/0179016 A1 | * | 12/2002 | Plymell | A01K 5/01 119/61.3 |
| 2005/0189532 A1 | * | 9/2005 | Gasaway | E04H 17/1413 256/65.11 |
| 2006/0255327 A1 | * | 11/2006 | Johnston | E04H 17/1413 256/59 |
| 2008/0127903 A1 | * | 6/2008 | Mann | A01K 5/01 119/657 |
| 2010/0193756 A1 | * | 8/2010 | Buckley | E04H 17/1413 256/65.04 |

FOREIGN PATENT DOCUMENTS

| | | | | |
|---|---|---|---|---|
| WO | WO-2011016735 A1 | * | 2/2011 | ............... A01K 5/01 |
| WO | WO-2012173499 A2 | * | 12/2012 | ............... A01K 5/01 |
| WO | WO-2018011595 A1 | * | 1/2018 | ............... A01K 5/01 |

* cited by examiner

*Primary Examiner* — Brady W Frazier
*Assistant Examiner* — Zoe Tam Tran
(74) *Attorney, Agent, or Firm* — Brian K. Yost; Decker Jones, PC

(57) ABSTRACT

The livestock trough and system comprises a perimeter wall, a bottom, an upper rim, one or more fence coupling members, and a slot, the slot being defined by the perimeter wall and adapted to be positioned adjacent to a central support member of a fence. One or more reinforcement members extend radially from a position adjacent to the slot to an inside surface of the perimeter wall. The central support member comprises a vertical elongated tubular element such as a pipe. In certain embodiments, the central support member comprises an H configuration and the slot is further defined by an interior wall such that a lower portion of a vertical post perimeter is coaxially arranged within the slot and a horizontal brace member spans between a first vertical post and a second vertical post.

19 Claims, 2 Drawing Sheets

LIVESTOCK TROUGH AND SYSTEM

BACKGROUND OF THE INVENTION

1. Field of the Invention

The present invention relates to livestock troughs and more specifically to a livestock feeding or watering trough and system adapted to partially surround a fence pole such that livestock separated by fence lines can feed or drink from the same trough.

2. Description of the Prior Art

Troughs are used for feeding and watering animals, and in particular, livestock such as cattle, horses, sheep, goats, and the like. Livestock troughs are generally man made and constructed of suitable materials such as galvanized steel, aluminum, polyresin, or plastic. Livestock troughs are found in many different sizes and shapes. Conventional troughs range in size from a under 100 gallons to many thousands of gallons. Some troughs are round. Others are rectangular. Still others are ovular. Troughs intended for feeding often comprise a cage-like structure that permits a food source, such as hay, for example, to be retained within a certain perimeter while at the same time permitting an animal to feed from the food source.

Most livestock troughs are single reservoir containers that are positioned in an enclosed animal feeding area such as a pasture. Conventional cattle operations involve use of numerous pastures separated from one another and outside areas by fences, gates, and other enclosures. A common enclosure is a barbed wire fence. In conventional cattle and other livestock operations, food and water positioned in a livestock trough is consumed by animals in the pasture in which the trough is positioned. Animals in one enclosed pasture are almost entirely limited to the food and water source present in the enclosed pasture. Because animals outside the pasture in which the trough is positioned cannot access the trough, separate arrangements must be made to provide food/water to each pasture.

There are a number of livestock troughs known in the art. For example, Kerns, US Pat. Pub. No. 2010/0263597 discloses a hay feeder that is separated by a panel that permits animals on both sides of the feeder to eat. Smoker, U.S. Pat. No. 3,092,077, discloses a feeder for livestock that has a fence through which an animal extends its head to feed from a trough. Lacey, US Pat. Pub. No. 2015/0020740, discloses a round bale feeder that permits animals to eat hay positioned in a center portion. Robison, US. Pat. Pat. Pub. No. 2018/0199539, discloses another round bale feeding arrangement in which the round bale is positioned behind a fence.

What is needed is a livestock trough and system that permits animals to feed or water from the same trough from multiple adjoining pastures at the same time.

SUMMARY OF THE INVENTION

The livestock trough generally comprises a perimeter wall, a bottom, an upper rim, one or more reinforcement members, one or more fence coupling members, and a slot. The perimeter wall is attached to the bottom so as to form an open topped container. The perimeter wall defines an upper opening through which an animal such as a horse or other livestock can access feed or water. The perimeter wall also defines the slot. The slot is a recessed area within the livestock trough that permits the trough to be positioned adjacent to a central support member of a fence. In preferred embodiments, the central support member is a single elongated round tubular element (a pipe, for example) that is partially buried in the ground. In some embodiments, the central support member is filled with concrete. In some embodiments, the central support member comprises one or more "H" configurations. In such embodiments, a center post is positioned near a center position of the trough and one or more outer posts are positioned outside the perimeter wall. The center post is connected to the outer post by a horizontal brace.

The central support member provides end support to a length of fence. The fence of the preferred embodiment is a wire fence such as a barbed wire fence composed of individual lengths of wire and supported by fence posts. In the preferred embodiment, the fence posts are conventional and commercially available T-posts.

The one or more fence coupling members of the preferred embodiment are vertically arranged and attached to an outer surface of the perimeter wall at positions aligned with the wires.

With this arrangement, the livestock trough can be accessed by animals at a corner/junction at which two or more pastures meet.

In some embodiments, the slot is an interior slot such that livestock trough comprises an angular torus configuration (i.e., a flat donut configuration). In such configuration, the slot serves as an annulus through which the central support member extends. In this embodiment, the central support member comprises the center post and respective outer posts and respective horizontal braces. In other embodiments in which the slot comprises a central annulus, the central support member comprise a single elongated tubular element such as a pipe or tube without horizontal braces.

In some embodiments, the livestock trough comprises one or more reinforcement members that help keep the livestock trough from becoming deformed upon tensioning of the wires. In preferred embodiments, the reinforcement members are formed from strong material such as steel so that the reinforcement members can adequately balance the tension forces exerted by the wires and prevent deformation of the perimeter wall. Preferably, the reinforcement members extend radially from a portion of the slot to an inside surface of the perimeter wall. In preferred embodiments, the respective reinforcement members extend perpendicularly to each respective fence coupling member. The livestock trough can have several reinforcement members. The reinforcement members provide stability to the livestock trough while also permitting the feed or water to be distributed evenly within the entire trough.

Also provided is a livestock trough and fence system. The livestock trough and fence system generally comprises the livestock trough and the fence. The livestock trough of the livestock trough and fence system is as described above in various embodiments. The fence of the livestock trough and fence system is as described above such that it comprises individual lengths of wire supported by fence posts.

In certain embodiments, the livestock trough comprises the perimeter wall; the bottom; and the slot; the bottom being sealingly connected to the perimeter wall such that the bottom and the perimeter wall define a receptacle adapted to receive feed or water. The slot is a recessed portion defined by slot defining portions of the perimeter wall. The slot is structured and arranged to nestingly receive the central support member of the fence. The fence coupling members are adapted for coupling to the fence. The one or more reinforcement members extend radially from one or more of the slot defining portions to opposite respective inside surfaces of the perimeter wall.

In certain embodiments, the livestock trough comprises the perimeter wall; the interior wall; the bottom; and the slot. The bottom spans from a base of the perimeter wall to a base of the interior wall such that the interior wall defines the annulus. The annulus is adapted to receive, coaxially, all or a portion of the central support member of the fence.

In certain of these embodiments, the central support member comprises an H configuration and comprises first and second vertical posts and the horizontal brace member which spans between the first vertical post and the second vertical post; the first vertical post being coaxially positioned within the annulus and the second vertical post being positioned outside the livestock trough. The perimeter wall and the interior wall are concentric with respect to one another, the perimeter wall being positioned outside the interior wall.

In certain embodiments, the livestock trough and fence system comprises the livestock trough and the fence; the livestock trough comprising the perimeter wall; the bottom; the one or more fence coupling members; and the slot, the slot being defined by the perimeter wall. In such embodiments, the fence comprises the central support member; the perimeter posts; and the wire. The slot of such embodiments is adapted to be positioned adjacent to the central support member and the one or more fence coupling members are adapted for coupling to the fence. In such embodiments, the livestock trough and fence system comprises one or more reinforcement members that extend radially from a position adjacent to the slot to an inside surface of the perimeter wall. In such embodiments, the central support member comprises the vertically arranged elongated tubular element. In such embodiments, the central support member comprises an H configuration.

In preferred embodiments, the livestock trough is formed from galvanized steel adapted to withstand heavy use and wear and tear. However, the livestock trough can be formed from any suitable material known in the art and need not be constructed from galvanized steel. Although the fence is described herein as a wire fence supported by T-posts, the fence need not be a wire fence with T-posts. Rather, the fence can be almost any type of conventional fence such as a stockade fence, a picket fence, a chain link fence, an electric fence, and the like.

In some embodiments, the livestock trough comprises an internal heater. In some embodiments, the livestock trough comprises an automatic water refill component. In some embodiments, the livestock trough comprises a drain hole and plug. In some embodiments, the livestock trough is UV and temperature-resistant.

In some embodiments, the fence couplings comprise one or more through openings adapted for use in connecting the wires to the trough. The through openings are also adapted for use in connecting other enclosure elements such as gates, paneled fencing, and the like.

DESCRIPTION OF THE PREFERRED EMBODIMENT

Figure 1:
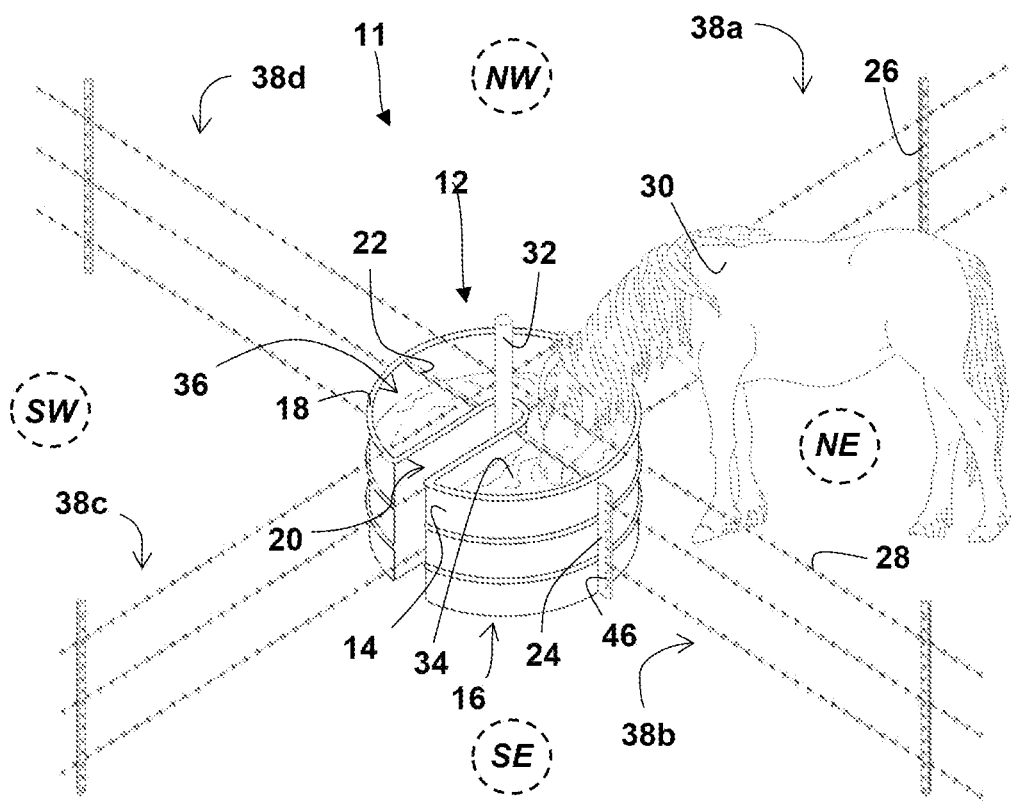
FIG. 1 is an isometric view of the livestock trough and system, in accordance with a preferred embodiment.
Figure 2:
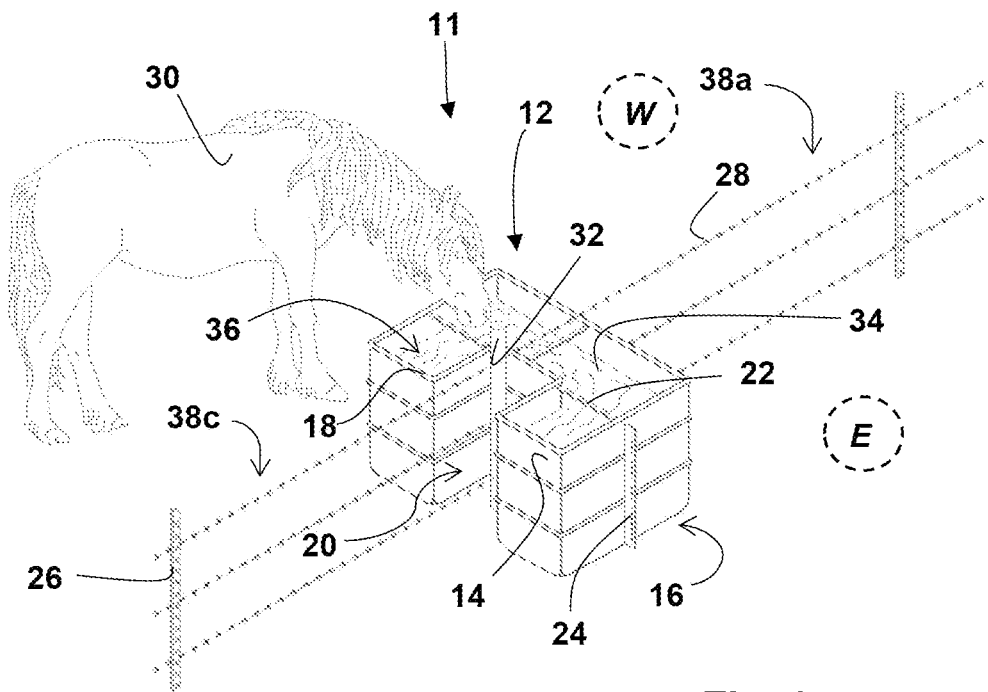
FIG. 2 an isometric view of the livestock trough and system, in accordance with another preferred embodiment.
Figure 4:
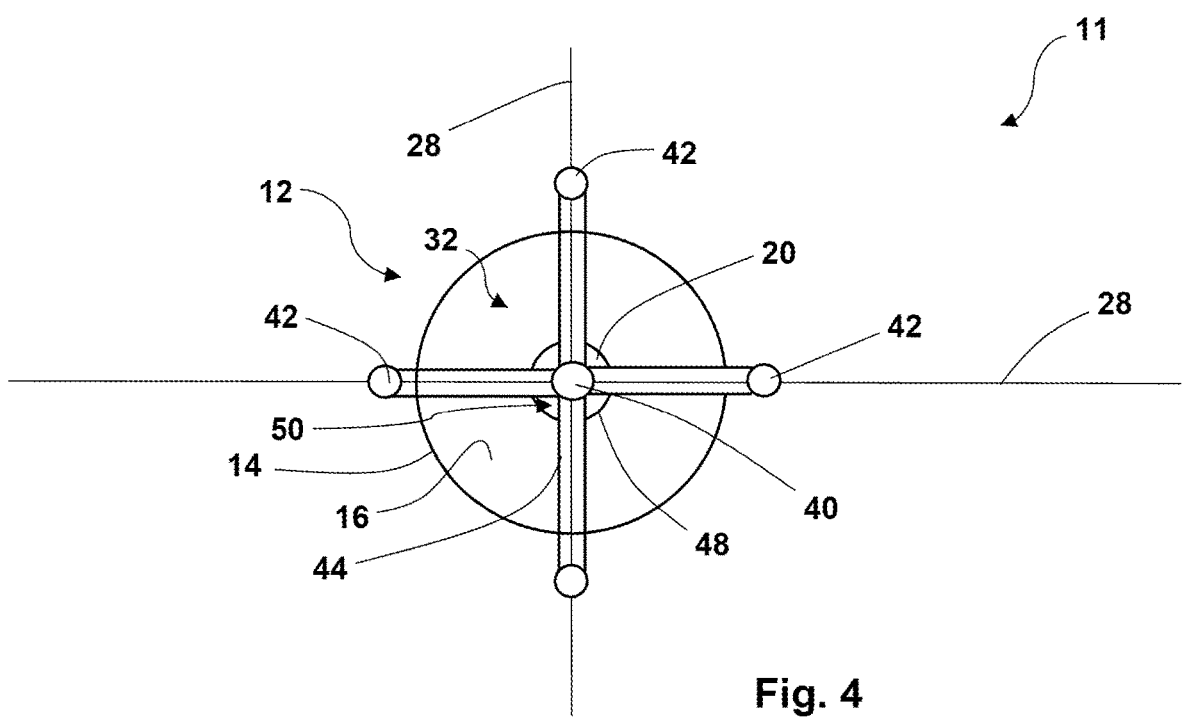
FIG. 4 is a plan view of the livestock trough and system in accordance with another preferred embodiment.

Referring to FIGS. 1, 2, and 4, there is shown the livestock trough 12 and livestock trough and fence system 11 in accordance with preferred embodiments. As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present disclosure. Thus, the appearances of such phrases in various places throughout this specification are not necessarily all referring to the same embodiment. Furthermore, the particular features, structures, or characteristics may be combined in any suitable manner on one or more embodiments without limitation. The detailed description illustrates by way of example, not by way of limitation, the principles of the invention. This description will clearly enable one skilled in the art to make and use the invention, and describes several embodiments, adaptations, variations, alternatives, and uses of the invention, including what is presently believed to be the best mode of carrying out the invention.

Referring to FIGS. 1 and 2, the livestock trough 12 generally comprises a perimeter wall 14, a bottom 16, an upper rim 18, one or more reinforcement members 22, one or more fence coupling members, 24, and a slot 20.

Figure 3:
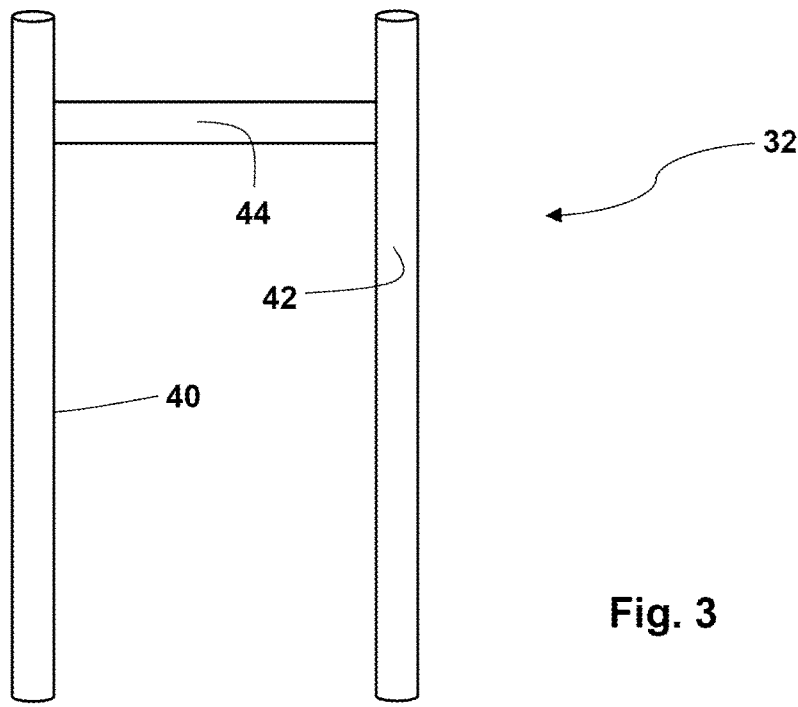
FIG. 3 is an isometric view of the central support member of the livestock trough in accordance with another preferred embodiment, the central support member comprising an "H" configuration.

The perimeter wall 14 is attached to the bottom 16 so as to form an open topped container. The perimeter wall 14 defines an upper opening 36 through which an animal 30 such as a horse can access feed or water 34. The perimeter wall 14 also defines the slot 20. The slot 20 is a recessed area within the livestock trough 12 that permits the trough 12 to be positioned adjacent to a central support member 32 of a fence 38. In preferred embodiments, the central support member 32 is a single vertical elongated tubular element (a pipe, for example) that is partially buried in the ground. In some embodiments, the central support member 32 is filled with concrete. Referring to FIGS. 3 & 4, in some embodiments, the central support member 32 comprises one or more "H" configurations. In such embodiments, a center post 40 is positioned near a center position of the trough 12 and one or more outer posts 42 are positioned outside the perimeter wall. The center post 40 is connected to the outer post by a horizontal brace 44.

The central support member 32 provides end support to a length of fence 38 (the fence referred to herein as element 38 or 38a-38d). The fence 38a-38d of the preferred embodiment is a wire fence 38a-38d such as a barbed wire fence 38a-38d composed of individual lengths of wire 28 and supported by fence posts 26. In the preferred embodiment, the fence posts 26 are conventional and commercially available T-posts 26.

The one or more fence coupling members 24 of the preferred embodiment are vertically arranged and attached to an outer surface of the perimeter wall 14 at positions aligned with the wires 28. In the preferred embodiment, the fence coupling members 24 are sturdy lengths of steel material welded to the outer surface of the perimeter wall 14. In some embodiments, the fence coupling members 24 comprise one or more through openings 46. Such through openings 46 are adapted for use in connecting the wires 28 to the trough 12. The through openings 46 are also adapted for use in connecting other enclosure elements such as gates, paneled fencing, and the like.

With this arrangement, the livestock trough 12 can be accessed by animals 30 at a corner/junction at which two or more pastures meet. In FIG. 1, four pastures are shown. These pastures are designated as NW (northwest), NE (northeast), SE (southeast), and SW (southwest). The fence components 38a, 38b, 38c, and 38d separate the respective pastures NW, NE, SE, SW depicted in FIG. 1. The central support member 32 of FIG. 1 is positioned at the junction of the four pastures NW, NE, SE, SW.

In FIG. 2, two pastures are shown. These pastures are designated as W (west) and E (east). The fences 38a, 38b and central support member 32 separate the two pastures W, E depicted in FIG. 2.

Referring to FIG. 1, there are three fence coupling members 24 with only the one nearest the viewer shown in the figure. In the configuration shown in FIG. 2, there are also three fence coupling members 24 with only the one nearest the viewer shown. In the configuration depicted in FIG. 2, the fence coupling member 24 that is positioned opposite the slot 20 is used to secure fence 38a. The fence coupling members 24 positioned in pastures W and E are not used in the configuration shown in FIG. 2 but stand ready to be used should a user decide to create an additional enclosure/pasture such as is shown in FIG. 1.

Referring to FIG. 4, in some embodiments, the slot 20 is an interior slot such that the livestock trough 12 comprises an angular torus configuration (i.e., a flat donut configuration). In such configuration, the slot 20 serves as an annulus 50 through which the central support member 32 extends. Therefore, in such embodiment, the trough 12 comprises, in addition to the perimeter wall 14, an interior wall 48 that defines the slot 20. The bottom 16 or this embodiment extends from a base of the perimeter wall 14 to a base of the interior wall 48. In this embodiment, the central support member 32 comprises the center post 40 and respective outer posts 42 and respective horizontal braces 44. In other embodiments in which the slot 20 comprises a central annulus 50, the central support member 32 comprise an elongated tubular element 40 such as a pipe or tube and no horizontal braces 44 or outer posts 42 are used.

In some embodiments, the livestock trough 12 comprises one or more reinforcement members 22. As a barbed wire fence 38a-d can exert great tension forces on attachment members such as the fence coupling members 24, the one or more reinforcement members 22 help keep the livestock trough 12 from becoming deformed upon tensioning of the wires 28 of the fence 38a-d. In preferred embodiments, the reinforcement members 22 are formed from strong material such as steel so that the reinforcement members 22 can adequately balance the tension forces exerted by the wires 28 and prevent deformation of the perimeter wall 14. Preferably, the reinforcement members 22 extend radially from a portion of the slot 20 to an inside surface of the perimeter wall 14, as shown in FIGS. 1 and 2. In preferred embodiments, the respective reinforcement members 22 extend perpendicularly to each respective fence coupling member 24. Although only the three uppermost reinforcement members 22 are shown in FIGS. 1 and 2, the livestock trough 12 can have several more reinforcement members 22 such as, for example, ones arranged parallel and below those shown in the figures. The reinforcement members 22 are tubular in configuration (square or round tubing, for example) and provide stability to the livestock trough 12 while also permitting the feed or water 34 to be distributed evenly within the entire trough 12.

Also provided is a livestock trough 12 and fence 38a-d system 11. Referring to FIGS. 1 and 2, the livestock trough 12 and fence 38 system 11 generally comprises the livestock trough 12 and the fence 38. The livestock trough 12 of the livestock trough 12 and fence 38 system 11 is as described above in the trough's 12 various embodiments such that the trough 12 generally comprises the perimeter wall 14, the bottom 16, the upper rim 18, one or more reinforcement members 22, the fence coupling members, 24, and the slot 20. The fence 38 of the livestock trough 12 and fence 38a-d system 11 is as described above such that it comprises individual lengths of wire 28 supported by fence posts 26 and the central support member 32.

In preferred embodiments of the trough 12 and the system 11, the livestock trough 12 is formed from galvanized steel adapted to withstand heavy use and wear and tear. However, the livestock trough 12 can be formed from any suitable material known in the art and need not be constructed from galvanized steel. Although the fence 38 is described herein as a wire fence supported by T-posts 26, the fence 38 need not be a wire fence 38 with T-posts 26. Rather, the fence 38 can be almost any type of conventional fence 38 such as a stockade fence 38, a picket fence 38, a chain link fence 38, an electric fence 38, and the like.

In certain embodiments, the livestock trough 12 comprises the perimeter wall 14; the bottom 16; and the slot 20; the bottom 16 being sealingly connected to the perimeter wall 14 such that the bottom 16 and the perimeter wall 14 define a receptacle 12 adapted to receive feed or water 34. The slot 20 is a recessed portion defined by slot defining portions of the perimeter wall 14. The slot 20 is structured and arranged to nestingly receive the central support member 32 of a fence 38. The fence coupling members 24 are adapted for coupling to the fence 38. The one or more reinforcement members [24] 22 extend radially from one or more of the slot defining portions to opposite respective inside surfaces of the perimeter wall 14.

In certain embodiments, the livestock trough 12 comprises the perimeter wall 14; the interior wall 48; the bottom 16; and the slot 20. The bottom 16 spans from a base of the perimeter wall 14 to a base of the interior wall 48 such that the interior wall 48 defines an annulus 50. The annulus 50 is adapted to receive, coaxially, all or a portion of the central support member 40 of the fence 38.

In certain of these embodiments, the central support member 32 comprises an H configuration and comprises first and second vertical posts 40, 42 and a horizontal brace member 44 which spans between the first vertical post 40 and the second vertical post 42; the first vertical post 40 being coaxially positioned within the annulus 50 and the second vertical post 42 being positioned outside the livestock trough 12. The perimeter wall 14 and the interior wall 48 are concentric with respect to one another, the perimeter wall 14 being positioned outside the interior wall 48.

In certain embodiments, the livestock trough 12 and fence 38 system 11 comprises the livestock trough 12 and the fence 38; the livestock trough 12 comprising the perimeter wall 14; the bottom 16; the one or more fence coupling members 24; and the slot 20, the slot 20 being defined by the perimeter wall 14. In such embodiments, the fence 38 comprises the central support member 32; the perimeter posts 26; and the wire 28. The slot 20 of such embodiments is adapted to be positioned adjacent to the central support member 32 and the one or more fence coupling members 24 are adapted for coupling to the fence 38. In such embodiments, the livestock trough 12 and fence 38 system comprises one or more reinforcement members 22 that extend radially from a position adjacent to the slot 20 to an inside surface of the perimeter wall 14. In such embodiments, the central support member 32 comprises the vertically arranged elongated tubular element 40. In such embodiments, the central support member 32 comprises an H configuration.

In certain embodiments, the slot 20 is further defined by the interior wall 48. The central support member 32 comprises a vertical post perimeter; and a lower portion of the vertical post perimeter is surrounded by the interior wall 48.

In certain such embodiments, the central support member 32 comprises an H configuration and the horizontal brace member 44 spanning between the first vertical post 40 and the second vertical post 42 which is positioned outside the livestock trough 12.

The use of the livestock trough 12 will now be discussed. The livestock trough 12 is arranged such that the slot 20 is positioned adjacent to the central support member 32 of the fence 38. Respective fence wires 28 are coupled to respective portions of the respective fence coupling members 24 and/or the central support member 32 such that a corner/junction is formed at which two or more pastures meet. The livestock trough 12 is filled with water or feed 34 such that the livestock trough 12 can be accessed, and the water or feed 34 consumed simultaneously, by animals 30 positioned in the two or more pastures NW, NE, SE, SW near the corner/junction.

In some embodiments, the livestock trough 12 comprises an internal heater.

In some embodiments, the livestock trough 12 comprises an automatic water refill component.

In some embodiments, the livestock trough 12 comprises a drain hole and plug.

In some embodiments, the livestock trough 12 is UV and temperature-resistant.

The foregoing disclosure and showings made in the drawings are merely illustrative of the principles of this invention and are not to be interpreted in a limiting sense. While there has been illustrated and described what is, at present, considered to be a preferred embodiment of the present invention, it will be understood by those skilled in the art that various changes and modifications may be made, and equivalents may be substituted for elements thereof without departing from the true scope of the invention. Therefore, it is intended that this invention not be limited to the particular embodiment disclosed as the best mode contemplated for carrying out the invention, but that the invention will include all embodiments falling within the scope of this disclosure and the claims.

The invention claimed is:

1. A livestock trough comprising:
a perimeter wall comprising side walls, an end wall, and a rim;
a bottom;
a slot; and
one or more fence coupling members:
the perimeter wall extending between the bottom and the rim such that the side walls, end walls and bottom define an open-topped receptacle adapted to receive feed or water;
the bottom and perimeter wall defining the slot, the slot being an angular or curved concave portion of the livestock trough;
the one or more fence coupling members comprising vertically arranged through openings, the through openings adapted for coupling to a fence;
the slot being structured and arranged to nestingly receive all or a portion of a central support member of the fence.

2. The livestock trough of claim 1 further comprising one or more reinforcement members.

3. The livestock trough of claim 1 the one or more reinforcement members extending radially from one or more slot defining portions to opposite respective inside surfaces of the perimeter wall, the one or more reinforcement members extending substantially parallel or coaxial to wires of the fence when the trough is coupled to the fence.

4. The livestock trough of claim 1 wherein the central support member comprises a vertically arranged elongated tubular element.

5. The livestock trough of claim 4 wherein the elongated tubular element is a pipe.

6. The livestock trough of claim 1 wherein the central support member comprises an H configuration.

7. A livestock trough comprising:
a perimeter wall comprising side walls, an interior wall and a rim;
a bottom;
a central support member;
one or more fence coupling members; and
a slot;
the perimeter wall extending between the bottom and the rim such that the side walls, interior wall and bottom define an open-topped receptacle adapted to receive feed or water;
the one or more fence coupling members comprising vertically arranged through openings, the through openings adapted for coupling to a fence.

8. The livestock trough of claim 7 wherein:
the central support member comprises an H configuration and comprises first and second vertical posts and a horizontal brace member;
the horizontal brace member spanning between the first vertical post and the second vertical post;
the first vertical post being coaxially positioned interior to the perimeter wall.

9. The livestock trough of claim 7 wherein:
the second vertical post is positioned exterior to the perimeter wall.

10. The livestock trough of claim 7 wherein the perimeter wall and the interior wall are concentric with respect to one another, the perimeter wall being positioned outside the interior wall.

11. A livestock trough and fence system comprising:
a livestock trough and a fence;
the livestock trough comprising:
a perimeter wall comprising side walls, an interior wall and a rim;
a bottom;
one or more fence coupling members; and a slot, the slot being defined by the bottom and the perimeter wall, the slot being an angular or curved concave portion of the livestock trough;

the perimeter wall extending between the bottom and the rim such that the side walls, end walls, bottom, and the perimeter wall define a receptacle adapted to receive feed or water;

the one or more fence coupling members comprising vertically arranged through openings, the through openings adapted for coupling to the fence;

the fence comprising:
   a central support member;
   perimeter posts; and
   wire;

the slot being adapted to be positioned adjacent to the central support member of the fence.

12. The livestock trough and fence system of claim 11 further comprising one or more reinforcement members.

13. The livestock trough and fence system of claim 12 wherein the one or more reinforcement members extend radially from a position adjacent to the slot to an inside surface of the perimeter wall.

14. The livestock trough and fence system of claim 11 wherein the central support member comprises a vertically arranged elongated tubular element.

15. The livestock trough and fence system of claim 14 wherein the elongated tubular element is a pipe.

16. The livestock trough and fence system of claim 11 wherein the central support member comprises an H configuration.

17. The livestock trough and fence system of claim 11 wherein:
   the slot is further defined by an interior wall;
   the central support member comprises a vertical post comprising a vertical post perimeter;
   a lower portion of the vertical post perimeter being surrounded by the interior wall.

18. The livestock trough and fence system of claim 17, wherein:
   the central support member comprises an H configuration and a horizontal brace member;
   the vertical post being a first vertical post;
   the horizontal brace member spanning between the first vertical post and a second vertical post.

19. The livestock trough and fence system of claim 14 wherein:
   the second vertical post is positioned exterior to the perimeter wall.

* * * * *